United States Patent
Buri et al.

(10) Patent No.: US 9,293,237 B2
(45) Date of Patent: Mar. 22, 2016

(54) USE OF 2-AMINOETHANOL AS ADDITIVE IN AQUEOUS SUSPENSIONS OF CALCIUM CARBONATE COMPRISING MATERIALS

(75) Inventors: Matthias Buri, Rothrist (CH); Samuel Rentsch, Aarburg (CH); Patrick A. C. Gane, Rothrist (CH)

(73) Assignee: Omya International AG, Oftringen (CH)

( * ) Notice: Subject to any disclaimer, the term of this patent is extended or adjusted under 35 U.S.C. 154(b) by 351 days.

(21) Appl. No.: 13/700,295

(22) PCT Filed: May 31, 2011

(86) PCT No.: PCT/EP2011/058940
§ 371 (c)(1),
(2), (4) Date: Jan. 2, 2013

(87) PCT Pub. No.: WO2011/154289
PCT Pub. Date: Dec. 15, 2011

(65) Prior Publication Data
US 2013/0207054 A1 Aug. 15, 2013

Related U.S. Application Data

(60) Provisional application No. 61/398,176, filed on Jun. 22, 2010.

(30) Foreign Application Priority Data

Jun. 7, 2010 (EP) .................................... 10165053

(51) Int. Cl.
| | | |
|---|---|---|
| H01B 1/12 | (2006.01) | |
| C09C 1/02 | (2006.01) | |
| D21H 17/67 | (2006.01) | |
| D21H 17/06 | (2006.01) | |
| D21H 17/07 | (2006.01) | |
| D21H 23/08 | (2006.01) | |

(52) U.S. Cl.
CPC ........ H01B 1/12 (2013.01); C09C 1/021 (2013.01); D21H 17/67 (2013.01); C01P 2004/61 (2013.01); C01P 2004/62 (2013.01); C01P 2006/22 (2013.01); C01P 2006/40 (2013.01); D21H 17/06 (2013.01); D21H 17/07 (2013.01); D21H 23/08 (2013.01)

(58) Field of Classification Search
None
See application file for complete search history.

(56) References Cited

U.S. PATENT DOCUMENTS 5,914,135 A * 6/1999 Dubek et al. .................. 424/687
6,991,705 B2  1/2006 Leino et al.

FOREIGN PATENT DOCUMENTS

| EP | 1795502 A1 | 6/2007 |
| EP | 2070991 A1 | 6/2009 |
| JP | 2011122022 A | 6/2011 |
| WO | 9849261 A1 | 11/1998 |
| WO | 9902608 A1 | 1/1999 |
| WO | 0039222 A1 | 7/2000 |
| WO | 0177273 A1 | 10/2001 |
| WO | 2004083316 A1 | 9/2004 |
| WO | 2009017660 A2 | 2/2009 |

OTHER PUBLICATIONS

Michael Ash, Irene (2013). Handbook of Plastics and Rubber Additives, vols. 1-2 (2nd Edition)—Calcium carbonate. Synapse Information Resources, Inc.. Online version available at: http://app.knovel.com/hotlink/pdf/id:kt00BZQ1T1/handbook-plastics-rubber/calcium-carbonate.*
International Search Report, dated Aug. 7, 2011 for PCT Application No. PCT/EP2011/058940.
Written Opinion of the International Searching Authority, dated Aug. 7, 2011 for PCT Application No. PCT/EP2011/058940.
Office Action, dated May 27, 2014 for Japanese Application No. JP 2013-513619.

* cited by examiner

*Primary Examiner* — Mark Kopec
*Assistant Examiner* — Jaison Thomas
(74) *Attorney, Agent, or Firm* — Amster, Rothstein & Ebenstein LLP

(57) ABSTRACT

Use of 2-aminoethanol as an additive in an aqueous suspension, containing from 25 to 62 vol. % of at least one calcium carbonate-comprising material, wherein the use provides improved stability with regard to the conductivity of the suspension.

24 Claims, No Drawings

USE OF 2-AMINOETHANOL AS ADDITIVE IN AQUEOUS SUSPENSIONS OF CALCIUM CARBONATE COMPRISING MATERIALS

CROSS-REFERENCE TO RELATED APPLICATIONS

This application is a U.S. national phase of PCT Application No. PCT/EP2011/058940, filed May 31, 2011, which claims priority to European Application No. 10165053.9, filed Jun. 7, 2010 and U.S. Application No. 61/398,176, filed Jun. 22, 2010.

The present invention relates to the technical domain of aqueous suspensions of calcium carbonate-comprising materials and additives added thereto.

In the preparation of aqueous suspensions of calcium carbonate-comprising materials, the skilled man is often required to select and introduce additives in order to regulate one or more characteristics of this suspension.

In making this additive selection, the skilled man must bear in mind that this additive should remain cost efficient and should not lead to unwanted interactions or effects downstream during the transportation, processing and application of this suspension.

Among the considerations of the skilled man that have rarely been addressed but which the Applicant has realised is of importance, is the selection of additives that do not cause a significant variation, and namely increase, in the electrical conductivity of the calcium carbonate-comprising material suspension.

Indeed, it may be advantageous to regulate aspects of the processing and transport of such a suspension based on measurements of the suspension's electrical conductivity.

For example, the flow rate of such a suspension through a given passage or unit may be controlled according to measurements made of the suspension conductivity. In the publication entitled "A Conductance Based Solids Concentration Sensor for Large Diameter Slurry Pipelines" by Klausner F et al. (J. Fluids Eng./Volume 122/Issue 4/Technical Papers), an instrument measuring the solids concentration of a slurry passing through pipelines of a given diameter based on conductance measurements is described. Based on these conductance measurements, it is possible to obtain a graphical display showing the variation of slurry concentration from the top to the bottom of the pipe, as well as the area-average concentration history.

The degree of filling of a container can likewise be managed by detecting conductivity at a given height along a container wall.

However, in order to use and take advantage of such regulation systems based on measurements of electrical conductivity, the skilled man is faced with the challenge of selecting additives needed to serve one or more functions that do not in parallel cause significant variations in the electrical conductivity values.

Among the functions of the additives used in calcium carbonate-comprising material suspensions, is the adjustment of the suspension pH, whether it is by acidification, neutralisation, or alkalinisation of this suspension.

Suspension alkalinisation is notably required in order to match the pH of application environments into which the suspension is introduced, or in preparation for the addition of pH-sensitive additives. A step of raising the pH may also serve to disinfect or support the disinfection of a suspension. Adjustments to pH may be necessary to avoid the unwanted dissolution of calcium carbonate on contact with an acidic environment during processing.

Such pH adjusting additives used in aqueous suspension of calcium carbonate-comprising material suspensions and available to the skilled man are numerous.

A first group of additives that may be used to raise the pH of an aqueous suspension of calcium carbonate-comprising materials are hydroxide-containing additives, and are especially alkali and earth alkali metal hydroxides.

For example, U.S. Pat. No. 6,991,705 refers to increasing the alkalinity of a pulp suspension, which may comprise calcium carbonate, by a combination of an alkali metal hydroxide feed, such as a sodium hydroxide feed, and a carbon dioxide feed.

Potassium hydroxide, magnesium hydroxide and ammonium hydroxide are other such additives used to control the pH of a PCC suspension in a range from 10 to 13, as referred to in EP 1 795 502.

A second group of additives that may be used to raise the pH of an aqueous suspension of calcium carbonate-comprising materials are additives that do not contain hydroxide ions, but which generate such ions on reaction with water.

Such additives may be salts, such as sodium salts, of weak acids. Examples of this type of additive would include sodium acetate, sodium bicarbonate, potassium carbonate and alkaline phosphates (such as tripolyphosphates, sodium and/or potassium orthophosphates).

A further possibility is to employ nitrogen-based additives, including for example ammonia, amines and amides, in order to increase the pH of calcium carbonate-comprising material suspensions.

All of the above additives raise the pH of the aqueous suspension according to a common mechanism, which is by providing or creating, following reaction with water, hydroxide ions in the suspension.

From the literature, it is know that increasing the hydroxide ion concentration under alkaline condition leads in parallel to an increased conductivity ("Analytikum", 5$^{th}$ Edition, 1981, VEB Deutscher Verlag für Grundstoffindustrie, Leipzig, page 185-186 referring to "Konduktometrische Titration").

Given the above general knowledge documented in the literature, along with the supporting evidence that alkali and earth alkali hydroxides, as well as amines such as triethanolamine cause a significant conductivity increase in parallel to raising the pH of an aqueous suspension of calcium carbonate-comprising materials, as shown in the Examples section hereafter, the skilled man could have no expectation that the 2-aminoethanol, that raises the suspension pH according to the same mechanism as these additives, i.e. by the resulting introduction of hydroxide ions in the suspension, would cause only a minimal conductivity increase, while he knows the non-published European patent applications with filing numbers 09 167246.9, 10 151603.7 and 10 151846.2 disclosing different particular pH regulating agents.

It was therefore entirely by surprise, and in contrast to the expectation based on common additives used to increase pH, that the Applicant identified that 2-aminoethanol can be used as an additive in an aqueous suspension and having a pH of between 8.5 and 11 and containing from 25 to 62 vol. % based on the total volume of the suspension of at least one calcium carbonate-comprising material, to increase the suspension pH by at least 0.3 pH units, while maintaining the suspension conductivity change to within 100 µS/cm/pH unit.

Therefore, a first object of the present invention resides in the use of 2-aminoethanol as additive in an aqueous suspension containing from 25 to 62 vol. % based on the total volume of the suspension of at least one calcium carbonate-comprising material and having a pH of between 8.5 and 11, to increase the suspension pH by at least 0.3 pH units, characterised in that the suspension conductivity change is maintained to within 100 µS/cm/pH unit.

"Conductivity" according to the present invention shall mean the electrical conductivity of an aqueous carbonate-comprising material suspension as measured according to the measurement method defined in the examples section herebelow.

For the purpose of the present invention, pH shall be measured according to the measurement method defined in the examples section herebelow.

The volume % (vol. %) of a solid material in suspension is determined according to the method defined in the examples section hereafter.

In a preferred embodiment, the said 2-aminoethanol additive is added as a water based solution to the calcium carbonate-comprising material.

In another preferred embodiment, the said 2-aminoethanol additive has a chemical purity of more than 90 wt %, preferably more than 95 wt %, more preferably more than 99 wt % in respect to 2-aminoethanol.

In a preferred embodiment, said suspension has a conductivity of between 700 and 2000 µS/cm, and preferably of between 800 and 1 300 µS/cm, prior to 2-aminoethanol addition.

In another preferred embodiment, following the addition of said 2-aminoethanol, the suspension conductivity is maintained to within 70 µS/cm/pH unit, and preferably to within 50 µS/cm/pH unit of the suspension conductivity value prior to 2-aminoethanol addition.

In another preferred embodiment, following the addition of said 2-aminoethanol, the change of suspension conductivity in µS/cm/pH unit is maintained at a value within 10%, preferably within 6%, and more preferably within 3%, of the suspension conductivity value prior to 2-aminoethanol addition.

In another preferred embodiment, prior to addition of said 2-aminoethanol, the suspension has a pH between 9 and 10.3.

In another preferred embodiment, 2-aminoethanol is added to said suspension in an amount to increase the pH of the aqueous suspension by at least 0.4 pH units.

When the suspension pH prior to 2-aminoethanol addition is between 8.5 and 9, said 2-aminoethanol is preferably added to said suspension in an amount to increase the pH of the suspension by at least 1.0 pH unit. In the case where the suspension pH prior to 2-aminoethanol addition is between 9 and 10, said 2-aminoethanol is preferably added to said suspension in an amount to increase the pH of the aqueous suspension by at least 0.7 pH units.

Prior to 2-aminoethanol, said suspension preferably has a temperature of between 5 and 100° C., more preferably of between 35 and 85° C., and even more preferably of between 45 and 75° C.

In a preferred embodiment, said 2-aminoethanol is added to said suspension in an amount of from 500 to 15 000 mg, preferably of from 1 000 to 5 000 mg, and more preferably of 1 300 to 2 000 mg, per liter of the aqueous phase of said suspension.

As regards said calcium carbonate-comprising material in suspension, this material preferably consists of at least 50%, preferably of at least 80%, and more preferably of at least 98%, by weight of calcium carbonate relative to the total equivalent dry weight of said calcium carbonate-comprising material.

The calcium carbonate of said carbonate-comprising material may be a precipitated calcium carbonate (PCC), a natural ground calcium carbonate (NGCC), a surface-reacted calcium carbonate (SRCC), or a mixture thereof.

Surface-reacted calcium carbonates are understood to refer to products resulting from the reaction of a calcium carbonate with an acid and carbon dioxide, said carbon dioxide being formed in situ by the acid treatment and/or supplied externally, and the surface-reacted natural calcium carbonate being prepared as an aqueous suspension having a pH of greater than 6.0, measured at 20° C. Such products are described in, among other documents, WO 00/39222, WO 2004/083316 and EP 2 070 991, the content of these references herewith being included in the present application.

In a preferred embodiment, said suspension comprises from 45 to 60 vol. % and preferably from 48 to 58 vol. % and most preferably from 49 to 57 vol. %, of said calcium carbonate-comprising material based on the total volume of said suspension.

In another preferred embodiment, said 2-aminoethanol is added prior to, during or after, and preferably after, a step of grinding said calcium carbonate-comprising material.

It may also be advantageous that said 2-aminoethanol be added to the dry form of said calcium carbonate-comprising material before forming said suspension of calcium carbonate-comprising material.

Following addition of said 2-aminoethanol to said suspension, the suspension may be introduced in a unit equipped with a conductivity-based regulation device.

For example, the suspension may be introduced in a container or unit up to a level determined by measurement of the suspension conductivity.

The suspension may additionally or alternatively be passed though a passage having a suspension throughput regulated as a function of the suspension conductivity.

In this respect, "passage" can relate to a confined region of throughput, as well as a throughput without any definition of confinement, i.e. after one passage of the process.

It is to be understood that the above-mentioned embodiments of the invention can be used and are contemplated to be used in combination with each other.

In view of the advantages of the use of 2-aminoethanol described above, a further aspect of the present invention refers to a method for increasing the pH of an aqueous suspension containing from 25 to 62 vol. % based on the total volume of the suspension of at least one calcium carbonate-comprising material and having a pH in the range of between 8.5 and 11 is provided, wherein the method involves the step of adding 2-aminoethanol to the suspension in an amount, so that the pH of the suspension is increased by at least 0.3 pH units, preferably by at least 0.5 or at least 0.7 pH units and, at the same time, the suspension conductivity change caused by the addition of 2-aminoethanol is not more than 100 µS/cm per pH unit, preferably is not more than 50 µS/cm per pH unit and very preferably is not more than 20 µS/cm per pH unit.

According to another embodiment of the present invention, the suspensions obtained by the inventive method or use may be used in paint and/or paper applications.

It is to be understood that the advantageous embodiments described above with respect to the inventive use of 2-aminoethanol also can be used for the inventive method. In other words, the preferred embodiments described above and any combinations of these embodiments can also be used for the inventive method.

The scope and interest of the invention will be better understood based on the following examples which are intended to illustrate certain embodiments of the invention and are non-limitative.

EXAMPLES

Measurement Methods

Suspension pH Measurement

The pH of a suspension is measured at 25° C. using a Mettler Toledo Seven Easy pH meter and a Mettler Toledo InLab® Expert Pro pH electrode.

A three point calibration (according to the segment method) of the instrument is first made using commercially available buffer solutions having pH values of 4, 7 and 10 at 20° C. (from Aldrich).

The reported pH values are the endpoint values detected by the instrument (the endpoint is when the measured signal differs by less than 0.1 mV from the average over the last 6 seconds).

Suspension Conductivity Measurement

The conductivity of a suspension is measured at 25° C. using Mettler Toledo Seven Multi instrumentation equipped with the corresponding Mettler Toledo conductivity expansion unit and a Mettler Toledo InLab® 730 conductivity probe, directly following stirring this suspension at 1 500 rpm using a pendraulik tooth disc stirrer.

The instrument is first calibrated in the relevant conductivity range using commercially available conductivity calibration solutions from Mettler Toledo. The influence of temperature on conductivity is automatically corrected by the linear correction mode.

Measured conductivities are reported for the reference temperature of 20° C. The reported conductivity values are the endpoint values detected by the instrument (the endpoint is when the measured conductivity differs by less than 0.4% from the average over the last 6 seconds).

Particle Size Distribution (Mass % Particles with a Diameter<X) and Weight Median Grain Diameter ($d_{50}$) of Particulate Material Weight median grain diameter and grain diameter mass distribution of a particulate material are determined via the sedimentation method, i.e. an analysis of sedimentation behaviour in a gravimetric field. The measurement is made with a Sedigraph™ 5100.

The method and the instrument are known to the skilled person and are commonly used to determine grain size of fillers and pigments. The measurement is carried out in an aqueous solution of 0.1% by weight of $Na_4P_2O_7$. The samples were dispersed using a high speed stirrer and ultrasonic.

Viscosity Measurement

The Brookfield viscosity is measured after 1 minute of stirring by the use of a RVT model Brookfield™ viscometer at room temperature and a rotation speed of 100 rpm (revolutions per minute) with the appropriate disc spindle 2, 3 or 4 at room temperature.

Volume Solids (Vol. %) of a Material in Suspension

The volume solids is determined by dividing the volume of the solid material by the total volume of the aqueous suspension.

The volume of the solid material is determined by weighing the solid material obtained by evaporating the aqueous phase of suspension and drying the obtained material to a constant weight, and converting this weight value to a volume value by division with the specific gravity of the solid material.

The examples herebelow, employing a material consisting of essentially only calcium carbonate, used a specific gravity value of 2.7 g/ml, based on that listed for natural calcite in the Handbook of Chemistry and Physics (CRC Press; 60th edition), for the purpose of the above volume solids calculation.

Weight Solids (% by Weight) of a Material in Suspension

The weight solids is determined by dividing the weight of the solid material by the total weight of the aqueous suspension.

The weight of the solid material is determined by weighing the solid material obtained by evaporating the aqueous phase of suspension and drying the obtained material to a constant weight Additive Addition Amount in mg per Liter of Aqueous Phase of a Suspension In order to evaluate the amount of additive per liter of the aqueous phase of a suspension, the volume in liters (l) of the aqueous phase is first determined by subtracting the volume of the solid phase (see volume solids determination above) from the total volume of the suspension.

Example 1

This example implements a natural calcium carbonate of Norwegian Marble origin obtained by first autogeneously dry grinding 10 to 300 mm calcium carbonate rocks to a fineness corresponding to a $d_{50}$ of between 42 to 48 µm, and subsequently wet grinding this dry-ground product in water in a 1.4-liter vertical bead mill (Dynomill) using 0.6-1 mm zirconium silicate beads at a weight solids content of between 5 and 15% by weight, until 95% by weight of the particles have a diameter<2 µm, 75% by weight of the particles have a diameter<1 µm, 8% by weight of the particles have a diameter<0.2 µm and a $d_{50}$ of 0.61 µm is reached. During the grinding processes, no dispersing or grinding aids are added.

The obtained suspension is then concentrated using a filter press to form a filter cake having a volume solids content of approximately 45% by volume. A subsequent thermal concentration following the addition of 0.45% by weight, based on the weight of solids, of a 50 molar % sodium-neutralised polyacrylic acid (Mw≅12 000 g/mol, Mn≅5 000 g/mol) and 0.20% by weight, based on the weight of solids, of sodium dihydrogen phosphate, leads to a suspension having a volume solids content of approximately 50% by volume.

0.4 kg of this suspension are introduced in a 1-liter beaker having a diameter of 8 cm. A pendraulik tooth disc stirrer is introduced in the beaker such the stirrer disc is located approximately 1 cm above the bottom of the beaker. The initial suspension conductivity and pH values measured are reported in the table below.

Under stirring at 5 000 rpm, the additive type (in the form of an aqueous solution), indicated in each of the tests described in the table below (PA=additive according to the prior art, IN=additive according to the present invention), is added in the indicated amount to the slurry over a period of one minute. After completed addition, the slurry is stirred for an additional 5 minutes, after which time the suspension pH and the conductivity are measured.

| Test | | Suspension volume solid content (vol. %) | Initial suspension conductivity (+/−10 µS/cm)/ pH (+/−0.1) | Additive Type (in solution)/ Solution concentration | Additive addition amount (mg/L of aqueous phase) | Conductivity (+/−10 µS/cm)/ pH (+/−0.1) after additive addition | Δ Conductivity |
|---|---|---|---|---|---|---|---|
| 1 | PA | 56.9 | 1024/8.8 | KOH/30% | 3565 | 1767/12.9 | +743 |
| 2 | IN | 56.9 | 1020/8.8 | 2-amino-ethanol 100% (Aldrich Nbr 02400) | 5141 | 1019/11.0 | −1 |

Differences in the pH, conductivity and viscosity of the initial suspension are due to aging effects of the suspension.

Further detailed experimental results are given in the table below.

| Test | Additive addition amount (mg/L of aqueous phase) | Brookfield viscosity [mPas at 23° C. ± 2° C. | pH at 23° C. ± 2° C. | Conductivity for the reference temperature of 20° C. |
|---|---|---|---|---|
| 2 | 0 | 432 | 8.8 | 1020 |
| | 734 | 338 | 9.6 | 991 |
| | 1468 | 310 | 9.9 | 996 |
| | 2205 | 298 | 10.3 | 997 |
| | 2939 | 298 | 10.4 | 1007 |
| | 4040 | 294 | 10.8 | 1011 |
| | 5141 | 294 | 11 | 1019 |

The results of the above table show that the objectives are attained solely by the process according to the invention.

The invention claimed is:

1. A method for increasing the pH of an aqueous suspension, containing from 25 to 62 vol. % based on the total volume of the suspension of at least one calcium carbonate-comprising material and having a pH in the range of between 8.5 and 11, comprising adding 2-aminoethanol to the suspension in an amount of from 500 to 15000 mg per liter of the aqueous phase of the suspension, so that the pH of the suspension is increased by at least 0.3 pH units and the conductivity change is not more than 100 µS/cm per pH unit, wherein 2-aminoethanol is added prior to, during or after, a step of grinding the calcium carbonate-comprising material.

2. The method according to claim 1, wherein the 2-aminoethanol additive is added as a water based solution to the calcium carbonate-comprising material.

3. The method according to claim 1, wherein the 2-aminoethanol additive has a chemical purity of more than 90 wt % in respect to 2-aminoethanol.

4. The method according to claim 1, wherein the 2-aminoethanol additive has a chemical purity of more than 95 wt % in respect to 2-aminoethanol.

5. The method according to claim 1, wherein the suspension has a conductivity of between 700 and 2000 µS/cm prior to 2-aminoethanol addition.

6. The method according to claim 1, wherein the suspension has a conductivity of between 800 and 1300 µS/cm prior to 2-aminoethanol addition.

7. The method according to claim 1, wherein following the addition of 2-aminoethanol, the conductivity change is within 70 µS/cm/pH unit of the suspension conductivity value prior to 2-aminoethanol addition.

8. The method according to claim 1, wherein following the addition of 2-aminoethanol, the conductivity change is within 50 µS/cm/pH unit of the suspension conductivity value prior to 2-aminoethanol addition.

9. The method according to claim 1, wherein following the addition of 2-aminoethanol, the suspension conductivity change in µS/cm/pH unit is maintained at a value within 10% of the suspension conductivity value prior to 2-aminoethanol addition.

10. The method according to claim 1, wherein prior to addition of 2-aminoethanol, the suspension has a pH between 9 and 10.3.

11. The method according to claim 1, wherein 2-aminoethanol is added to the suspension in an amount to increase the pH of the suspension by at least 0.4 pH units.

12. The method according to claim 1, wherein when the suspension pH prior to 2-aminoethanol addition is between 8.5 and 9, 2-aminoethanol is added to the suspension in an amount to increase the pH of the suspension by at least 1.0 pH unit, and when the suspension pH prior to 2-aminoethanol addition is between 9 and 10, 2-aminoethanol is added to the suspension in an amount to increase the pH of the suspension by at least 0.7 pH units.

13. The method according to claim 1, wherein prior to 2-aminoethanol addition, the suspension has a temperature of between 5 and 100° C.

14. The method according to claim 1, wherein 2-aminoethanol is added to the suspension in an amount of from 1000 to 5000 mg per liter of the of the aqueous phase of the suspension.

15. The method according to claim 1, wherein the calcium carbonate-comprising material comprises at least 50% by weight of calcium carbonate relative to the total weight of the calcium carbonate-comprising material.

16. The method according to claim 1, wherein the calcium carbonate of the carbonate-comprising material is a precipitated calcium carbonate (PCC), a natural ground calcium carbonate (NGCC), a surface-reacted calcium carbonate (SRCC), or any mixture thereof.

17. The method according to claim 1, wherein the suspension comprises from 45 to 60 vol. % of said calcium carbonate-comprising material based on the total volume of the suspension.

18. The method according to claim 1, wherein the suspension comprises from 48 to 58 vol. % of said calcium carbonate-comprising material based on the total volume of the suspension.

19. The method according to claim 1, wherein the suspension comprises from 49 to 57 vol. % of said calcium carbonate-comprising material based on the total volume of the suspension.

20. The method according to claim 1, wherein 2-aminoethanol is added to the dry form of the calcium carbonate-comprising material, before forming the suspension of calcium carbonate-comprising material.

21. The method according to claim 1, wherein following addition of 2-aminoethanol to the suspension, the suspension is introduced in a unit equipped with a conductivity-based regulation device.

22. The method according to claim 1, wherein following addition of 2-aminoethanol to the suspension, the suspension is introduced in a container or unit up to a level determined by measurement of the suspension conductivity.

23. The method according to claim 1, wherein following addition of the 2-aminoethanol to the suspension, the suspension is passed though a passage having a suspension throughput regulated as a function of the suspension conductivity.

24. The method according to claim 1, wherein the suspension obtained by the method is used in paint and/or paper applications.

* * * * *

UNITED STATES PATENT AND TRADEMARK OFFICE
CERTIFICATE OF CORRECTION

PATENT NO. : 9,293,237 B2
APPLICATION NO. : 13/700295
DATED : March 22, 2016
INVENTOR(S) : Buri et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 358 days.

Signed and Sealed this
Twenty-sixth Day of July, 2016

Michelle K. Lee
*Director of the United States Patent and Trademark Office*